(12) United States Patent
Ueda

(10) Patent No.: US 6,447,940 B1
(45) Date of Patent: Sep. 10, 2002

(54) EVAPORATION CONTROL METHOD FOR LIQUID FUEL IN FUEL CELL SYSTEM

(75) Inventor: Kenichirou Ueda, Tochigi (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 122 days.

(21) Appl. No.: 09/590,290

(22) Filed: Jun. 9, 2000

(30) Foreign Application Priority Data

Jun. 15, 1999 (JP) .......................................... 11-167664

(51) Int. Cl.⁷ ............................................... H01M 8/04
(52) U.S. Cl. .............................. 429/24; 429/26; 429/13; 429/17
(58) Field of Search ............................. 429/12, 13, 17, 429/19, 20, 24, 22, 26, 34

(56) References Cited

U.S. PATENT DOCUMENTS 5,985,474 A * 11/1999 Chen et al. .................... 429/17
6,165,633 A * 12/2000 Negishi ......................... 429/17
6,183,895 B1 * 2/2001 Kudo et al. .................... 429/20
6,277,508 B1 * 8/2001 Reiser et al. .................. 429/17

* cited by examiner

Primary Examiner—Stephen Kalafut
Assistant Examiner—R Alejandro
(74) Attorney, Agent, or Firm—Arent Fox Kintner Plotkin & Kahn

(57) ABSTRACT

An evaporation control method for liquid fuel in a fuel cell system, the fuel cell system comprising: a fuel reforming apparatus formed of an evaporator for evaporating liquid fuel, a reforming device for making gas evaporated by the evaporator react by a solid catalyst to form fuel gas, and a CO removing device for removing carbon monoxide from the fuel gas generated by the reforming device; a fuel cell for making hydrogen in the fuel gas provided from the fuel reforming apparatus react with oxygen provided from an oxidizing agent providing means to generate electric power; and a burner for burning off-gas of an anode of the fuel cell to generate combustion gas to be a heating source of the evaporator, in which a temperature detector 8 for detecting temperature is provided at a bottom of an evaporation chamber of the evaporator 1 and a supply amount of the liquid fuel to the evaporator 1 is reduced and controlled from a supply amount (command value) corresponding to a required load amount of the fuel cell 103 in accordance with the detected temperature.

23 Claims, 4 Drawing Sheets

EVAPORATION CONTROL METHOD FOR LIQUID FUEL IN FUEL CELL SYSTEM

FIELD OF THE INVENTION

The present invention relates to an evaporation control method for liquid fuel in a fuel cell system, and more particularly to an evaporation control method for liquid fuel in an evaporator for preventing liquid accumulation, i.e., preventing liquid fuel from accumulating in liquid state in an evaporation chamber of the evaporator when power load is increased suddenly. The present invention also relates to a fuel cell system applying such a method.

BACKGROUND OF THE INVENTION

A fuel cell system is an electric power generation system centered on a fuel cell generating electricity by providing an anode of the fuel cell with hydrogen as fuel gas and providing a cathode of the fuel cell with oxidation gas containing oxygen. The fuel cell system converts directly chemical energy into electrical energy and has high efficiency of electric power generation and an extremely low emission amount of a toxic substance, therefore, receives attention recently.

However, in the fuel cell system, from the viewpoint of difficulty of handling hydrogen and diversification of fuel, liquid fuel from, e.g., methane gas and methanol on down except for hydrogen is reformed by a reforming device and the reformed gas having generated hydrogen as the main ingredient is often used as fuel gas. It will take much time to fill with hydrogen a conveyance such as a vehicle on which the fuel cell system is mounted, e.g., a fuel cell electric vehicle. Therefore, it is inconvenient to use hydrogen. Moreover, it is difficult to increase an amount of hydrogen, which can be mounted, accordingly, there is a drawback that mileage is shortened.

Therefore, it is considered to fill a tank mounted on a vehicle with liquid fuel such as methanol to be reformed by reforming device and the reformed gas having generated hydrogen as the main ingredient to be used as fuel gas.

It can be carried out to fill a vehicle with methanol as with a refueling gasoline engine vehicle and mileage in this case bears comparison with that of a gasoline engine vehicle. Therefore, the vehicle in this case is handled as with a refueling gasoline engine vehicle.

As shown in FIG. 5, a fuel reforming apparatus of a conventional fuel cell system to be mounted on a vehicle is formed of an evaporator 100 for evaporating the liquid fuel, a reforming device 101 for making gas of the liquid fuel evaporated by the evaporator 100, react by a solid catalyst to form fuel gas, and a CO removing device 102 for removing carbon monoxide from the fuel gas generated by the reforming device 101. The conventional fuel cell system comprises the fuel reforming apparatus, a fuel cell 103 for making hydrogen in the fuel gas provided from the fuel reforming apparatus with oxygen in the air compressed by an air compressor of an oxidizing agent providing means to generate electric power, and a burner 104 with an auxiliary fuel supplying line for burning off-gas of an anode of the fuel cell 103 to generate gas to be a heating source of the evaporator 100.

However, there is a problem in the conventional art. When the vehicle accelerates or goes up a hill, a required load (electric power) of the fuel cell 103 is increased and a supply amount of the liquid fuel is increased suddenly at the same time. A load of the evaporator 100 is changed suddenly and supply of the off-gas to the burner 104 cannot reach the required amount immediately, therefore, there is a shortage of an amount of heat of the burner 104. Accordingly, the liquid fuel cannot be evaporated completely and there is liquid accumulation, i.e., the liquid fuel accumulates in liquid state in an evaporation chamber of the evaporator 100.

When there is liquid accumulation, even if supply of the liquid fuel to the evaporator 100 is cut off by a cut-off valve at lightening the load when the vehicle decelerates or goes down a hill, there is liquid fuel remaining in the evaporation chamber of the evaporator 100. Therefore, the liquid fuel continues to be evaporated and responsivity of the evaporator 100 is deteriorated. The evaporation gas is supplied to the reforming device 101 and reformed to hydrogen-rich gas to continue being supplied to the fuel cell 103. At decreasing the load, the fuel cell 103 cannot consume completely the fuel gas, therefore, an amount of off-gas is increased and it causes overheating of the burner 104 and deterioration of heating efficiency.

When the liquid fuel is a mixture, in a low temperature evaporation state in which there is liquid accumulation, an ingredient easy to evaporate is evaporated early because different materials coexist. Therefore, there is a problem that composition of gas at an outlet of the evaporator 100 exhibits variations. As a consequence, there are problems relating to control of an amount of air and temperature of the reforming device 101 and the CO removing device 102. It causes that there is a shortage of an amount of water vapor to be supplied to the fuel cell 103 and carbon monoxide cannot be removed completely, therefore, an electrode component of the fuel cell 103 is rendered poisonous and performance of a fuel reforming apparatus deteriorates.

Therefore, for operating a system having large load regulation such as a fuel cell electric vehicle with efficiency, the supply amount of the liquid fuel to the evaporator 100 need be controlled so as to prevent liquid accumulation in the evaporation chamber of the evaporator 100.

Conventionally, following methods for doing away with liquid accumulation are adapted.

(1) The burner 104 is supplied with auxiliary fuel and the auxiliary fuel is burned so that combustion gas is generated and an amount of heat of it makes up for a shortage of an amount of heat of the burner 104.

(2) An amount of air for supplying to the burner 104 is reduced (a ratio air to fuel is reduced) and an amount of heat carried out by exhaust gas from the burner 104 to the outside so that the temperature of combustion gas of the burner 104 is increased.

However, optimum control cannot be achieved by the above-described methods.

The present invention is provided for solving the above-described problems and an object of the present invention is to provide an evaporation control method for liquid fuel in an evaporator for controlling liquid accumulation of liquid fuel in an evaporation chamber of the evaporator.

SUMMARY OF THE INVENTION

To solve the above-described problem, a first aspect of the present invention provides an evaporation control method for liquid fuel in a fuel cell system, the fuel cell system comprising:

a fuel reforming apparatus formed of an evaporator for evaporating liquid fuel, a reforming device for making gas of the liquid fuel evaporated by the evaporator react by a solid catalyst to be hydrogen-rich fuel gas, and a CO removing device for removing carbon monoxide from the fuel gas generated by the reforming device;

a fuel cell for making hydrogen in the fuel gas provided from the fuel reforming apparatus react with oxygen provided from an oxidizing agent providing means to generate electric power; and a burner for burning off-gas of an anode of the fuel cell to generate combustion gas to be a heating source of the evaporator, in which a temperature detector for detecting temperature at a bottom of an evaporation chamber is provided in the evaporator and a supply amount of the liquid fuel to the evaporator is reduced and controlled from a supply amount (command value) corresponding to a required load amount of the fuel cell in accordance with temperature detected by the temperature detector.

The temperature detector is provided at the bottom of the evaporation chamber of the evaporator and the supply amount of the liquid fuel to the evaporator is reduced and controlled from the supply amount (a command value) of the liquid fuel corresponding to the required load amount of the fuel cell in accordance with temperature detected by the temperature detector. Therefore, liquid accumulation in the evaporation chamber of the evaporator can be prevented.

A second aspect of the present invention according to the first aspect provides an evaporation control method for liquid fuel in a fuel cell system in which the supply amount of the liquid fuel to the evaporator is reduced and controlled on the basis of the detected temperature at the bottom of the evaporation chamber and the liquid fuel is controlled and prevented from accumulating in liquid state in the evaporation chamber of the evaporator.

The supply amount of the liquid fuel to the evaporator is reduced and controlled on the basis of the detected temperature in the evaporation chamber of the evaporator, therefore, the liquid fuel can be controlled and prevented from accumulating in liquid state in the evaporation chamber of the evaporator.

The third aspect of the present invention according to the first or second aspect provides an evaporation control method for liquid fuel in a fuel cell system in which it is stopped to supply the liquid fuel to the evaporator on the basis of the detected temperature at the bottom of the evaporation chamber and a state in which the liquid fuel is accumulated in liquid state in the evaporation chamber of the evaporator is done away with.

It is stopped to supply the liquid fuel to the evaporator on the basis of the detected temperature at the bottom of the evaporation chamber of the evaporator, therefore, a state in which the liquid fuel is accumulated in liquid state in the evaporation chamber of the evaporator can be controlled to do away with.

The forth aspect of the present invention according to the first, second or third aspect provides an evaporation control method for liquid fuel in a fuel cell system in which temperature of the combustion gas of the burner is detected, auxiliary combustion is carried out or stopped in accordance with the detected temperature of the combustion gas and the supply amount of the liquid fuel to the evaporator is controlled with maintaining the temperature of the combustion gas supplied to the evaporator in a predetermined range.

The temperature of the combustion gas of the burner is detected, auxiliary combustion is carried out or stopped in accordance with the detected temperature of the combustion gas and the supply amount of the liquid fuel to the evaporator is controlled with maintaining the temperature of the combustion gas supplied to the evaporator in the predetermined range. Therefore, the combustion gas to be a heating source of the evaporator is secured with stability. Liquid accumulation in the evaporation chamber of the evaporator can be prevented and controlled more suitably in comparison with a case in which the supply amount of the liquid fuel to the evaporator is controlled on the basis of only the detected temperature at the bottom of the evaporation chamber.

The fifth aspect of the present invention according to the first, second, third or forth aspect provides an evaporation control method for liquid fuel in a fuel cell system in which when the supply amount of the liquid fuel to the evaporator is subjected to "reduction" or "stop" control, output of the fuel cell is limited to an output value in accordance with the supply amount of the liquid fuel.

The output of the fuel cell is limited to the output value in accordance with the supply amount of the liquid fuel to the evaporator, therefore, the whole fuel cell system can be subjected to power control without laboring.

DESCRIPTION OF THE PREFERRED EMBODIMENTS

Figure 1:
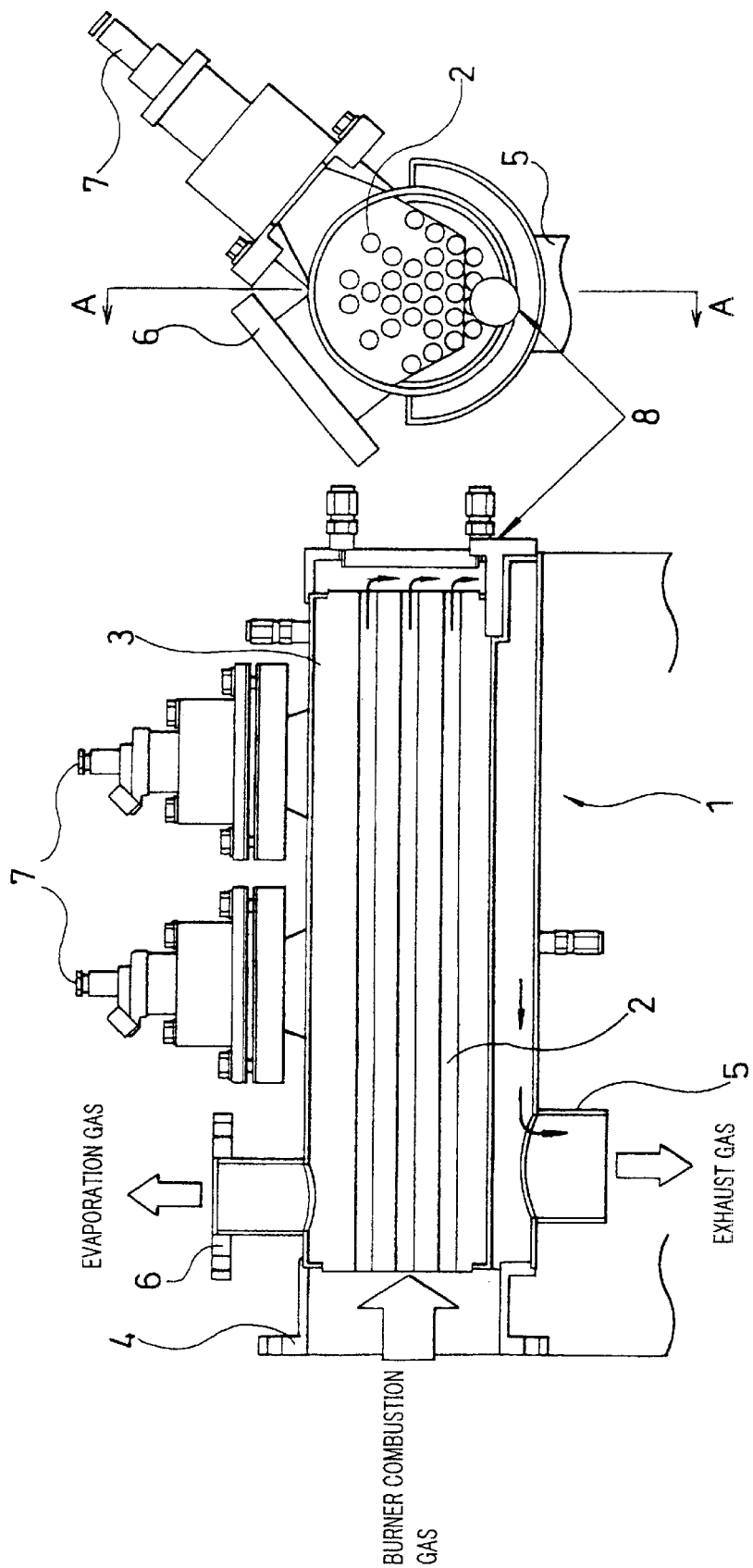
FIG. 1A is an elevational section (section of line A—A in FIG. 1B) of an evaporator suitable for the present invention.
FIG. 1B is a longitudinal section of FIG. 1A.
Figure 2:
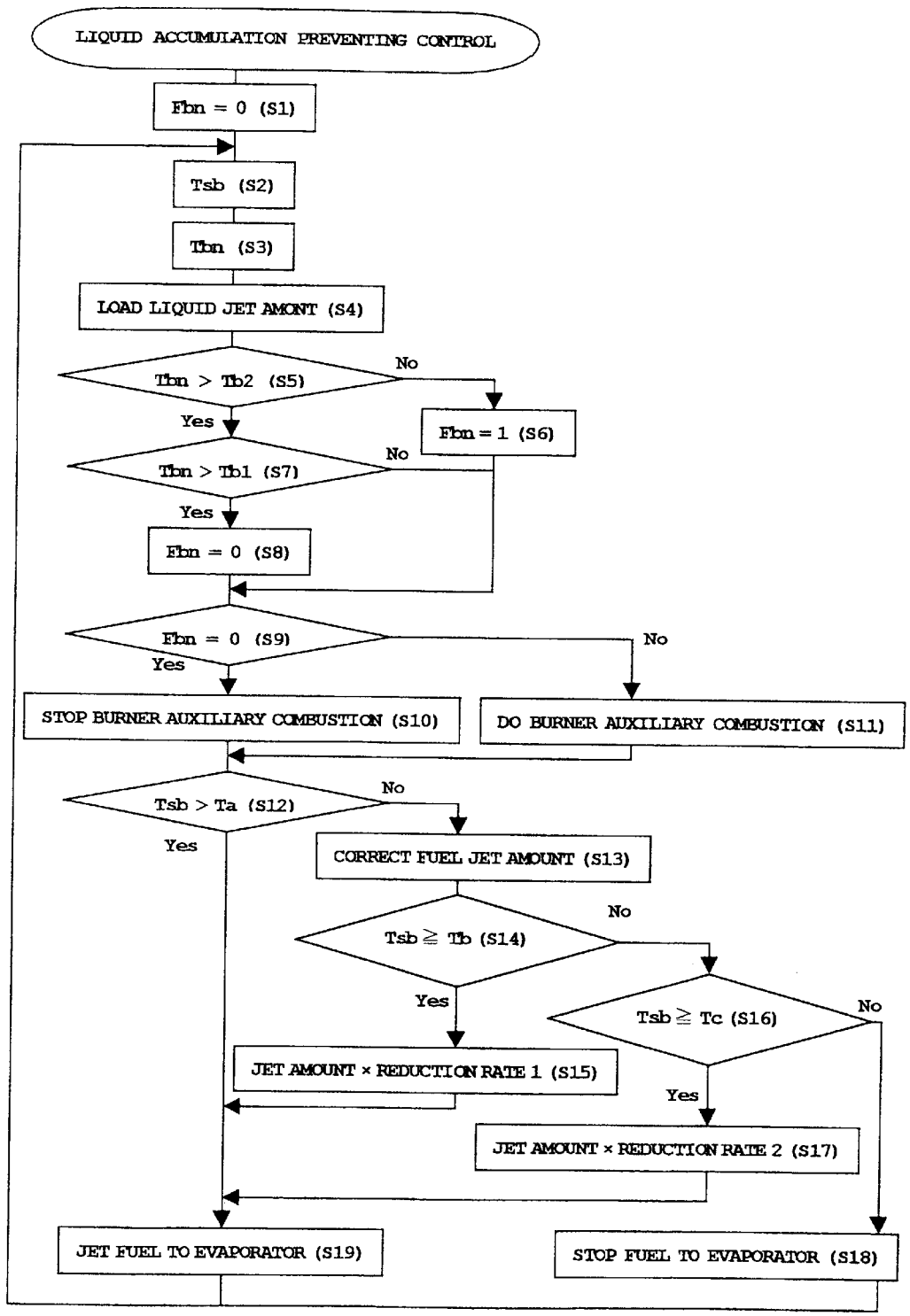
FIG. 2 is a control flowchart of a fuel jet amount wherein liquid accumulation in an evaporation chamber of an evaporator is prevented.
Figure 3:
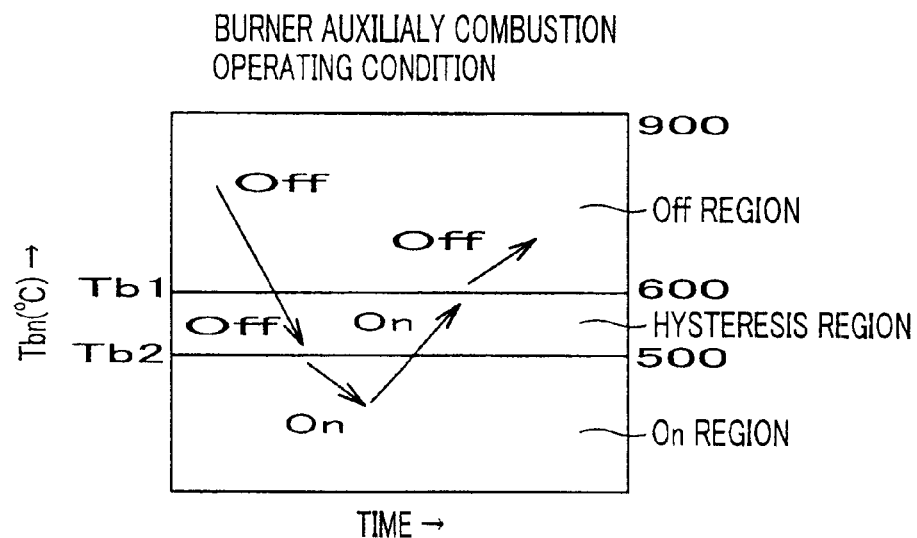
FIG. 3 is a view showing burner auxiliary combustion operating conditions in FIG. 2.
Figure 4:
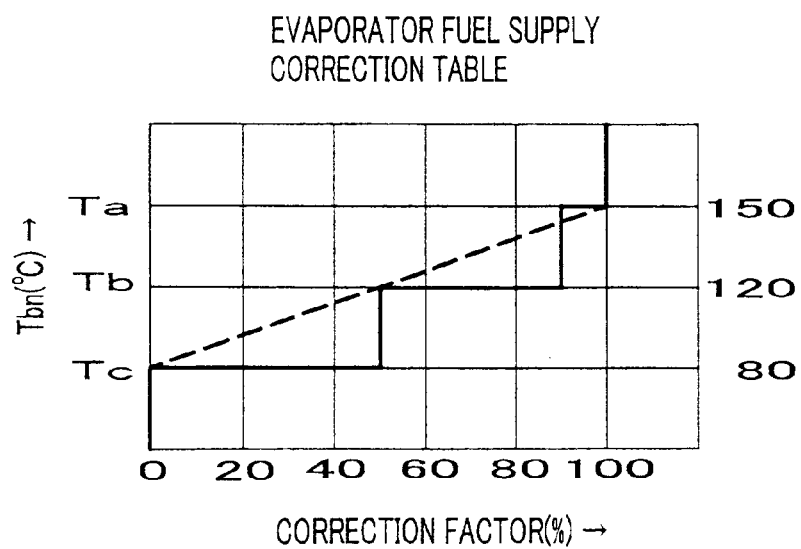
FIG. 4 is a correction table of a supply amount at reducing and supplying a fuel jet amount to the evaporator in FIG. 2.
Figure 5:
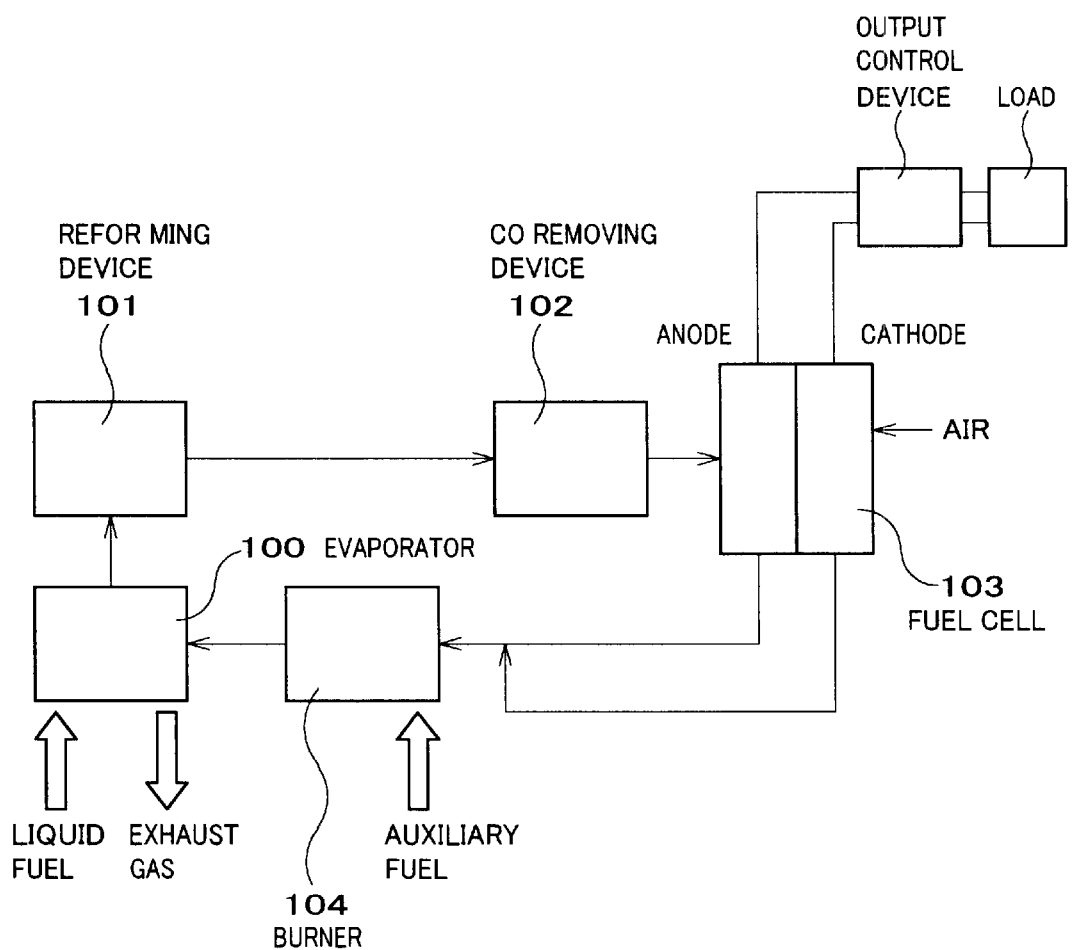
FIG. 5 is a general schematic block diagram of a conventional fuel cell system.

An embodiment of an evaporation control method for liquid fuel in a fuel cell system according to the present invention will now be described by referring to drawings. FIG. 1A is an elevational section (section of line A—A in FIG. 1B) of an evaporator suitable for the present invention, FIG. 1B is a longitudinal section of FIG. 1A. FIG. 2 is a control flowchart of a fuel jet amount wherein liquid accumulation in an evaporation chamber of an evaporator is prevented. FIG. 3 is a view showing burner auxiliary combustion operating conditions in FIG. 2. FIG. 4 is a correction table of a supply amount at reducing and supplying a fuel jet amount to the evaporator in FIG. 2.

Evaporation control method for liquid fuel in a fuel cell system will be described with reference to the accompanying drawings, in which parts similar to those previously described as a prior art fuel cell system with reference to FIG. v5 are denoted by the same reference numerals.

A fuel cell system according to this preferred embodiment mainly comprises a fuel reforming apparatus, a fuel cell 103 and a burner 104. The fuel reforming apparatus includes an evaporator 1 for evaporating liquid fuel, a reforming device 101 for reacting gas of the liquid fuel evaporated by the evaporator 1 on a solid catalyst in order to form fuel gas, and a CO removing device 102 for removing carbon monoxide from the fuel gas generated by the reforming device 101. The fuel cell 103 is for reacting hydrogen in the fuel gas, which is supplied from the fuel reforming apparatus, with oxygen within the air, which is compressed by an air compressor as an oxidizing agent supplying means, thereby generating electric power. The burner 104 has an auxiliary fuel supplying line for burning off-gas of an anode of the fuel cell 103 to generate gas as a heating source of the evaporator 1.

The evaporator 1 is a multipipe heat exchanger as shown in FIGS. 1A and 1B. High-temperature combustion gas generated by burning at a burner 104 passes through a pipe 2 of the evaporator 1. An amount of the liquid fuel in accordance with a required load (electric power) of the fuel cell 103 is provided to a shell 3 of an evaporation chamber via a nozzle 7 and the liquid fuel is evaporated via an outer wall of the pipe 2 by held heat of the high-temperature combustion gas. As for the multipipe heat exchanger, a bayonet type heat exchanger may be used so as to absorb a thermal expansion from temperature difference between the pipe 2 and the shell 3.

The high-temperature combustion gas generated by burning at a burner 104 in a temperature range of 600 to 700, as shown FIG. 1A, is introduced from a burner combustion gas inlet 4 of the evaporator 1 into the pipe 2 of the evaporator 1. After the high-temperature combustion gas passes through an inside of a plurality of pipes 2 whose both ends are fixed and supported by two tube plates, passes through a semi-annular path and makes a U-turn to a side of the burner combustion gas inlet 4 to be exhaust gas so as to be discharged from a burner combustion gas outlet 5. A flow of combustion gas in the pipe 2 of the evaporator 1 is indicated by the arrows.

On the other hand, the liquid fuel jetted by the nozzle 7 is heated on the outer wall of the pipe 2 to be evaporation gas and the evaporation gas is introduced from an evaporation gas outlet 6 into a reforming device 101.

A heat-exchanging operation on the high-temperature combustion gas has finished in the evaporator 1 and the high-temperature combustion gas is discharged from an end portion of the pipe 2. A temperature detector 8 is provided on a bottom of the shell 3 of an evaporation chamber in the vicinity of the end portion of the pipe 2. A channel is formed around a sensor provided on an end of the temperature detector 8 for accumulating liquid easily when there is liquid accumulation. The channel has any shape, which can be filled with liquid around the sensor.

As for the temperature detector 8, e.g., a chromel-alumel thermocouple, which can detect through about 1000° C., can be used because there is a case in which supplying the liquid fuel to the evaporator 1 is stopped and only the combustion gas of the burner 104 is burned. When a thermocouple having a small-diameter wire is used, responsivity is improved.

A thermometer is provided on the burner 104 supplying the combustion gas to be a heating source of the evaporator 1, and combustion gas temperature Tbn of the burner 104 can be watched for preventing the burner 104 from deforming by heat. The burner 104 has an auxiliary fuel supplying line for making up for a shortage of an amount of heat of the burner 104.

The temperature detector 8 is provided on a bottom of the shell 3, which is an evaporation chamber of the evaporator 1. Therefore, when there is no liquid accumulation and the liquid fuel is gasified completely, temperature Tsb of the bottom of the evaporation chamber detected by the temperature detector 8 is over temperature Ta (e.g., 150° C.) for supplying the gasified liquid fuel to the reforming device 101. When there is liquid accumulation, the temperature Tsb detected by the temperature detector 8 is temperature Tc (e.g., 80° C.), which is a boiling point of water or less. Using above-described facts, in accordance with the temperature Tsb of the bottom of the evaporation chamber detected by the temperature detector 8, liquid accumulation in the evaporation chamber can be prevented by reducing and controlling a supply amount of the liquid fuel to the evaporator 1.

On the other hand, when there is liquid accumulation, supplying the liquid fuel to the evaporator 1 can be stopped and liquid accumulation can be done away with.

Combustion gas temperature Tbn of the burner 104 wherein the combustion gas is a heating source of the evaporator 1 as well as temperature Tsb of the bottom of the evaporation chamber is loaded as data. A control operation of auxiliary combustion of the burner 104 can hold the combustion gas temperature Tbn in a predetermined range using safety temperature Tb1 (e.g., 600° C.) of the burner 104. The data and the control operation are used in combination, therefore, the supply amount of the liquid fuel to the evaporator 1 is controlled more preferably preventing liquid accumulation in the evaporation chamber in the evaporator 1.

An embodiment of an evaporation control method for the liquid fuel in a fuel cell system according to the present invention will now be described in detail by referring to FIGS. 2 to 5.

A fuel jet amount of the supply amount of the liquid fuel to the evaporator 1 is increased suddenly when the vehicle accelerates or goes up a hill and the following operations are carried out.

(1) Temperature Tsb of the bottom of the evaporation chamber and combustion gas temperature Tbn of the burner 104 wherein the combustion gas is a heating source of the evaporator 1 are loaded as data (S2 and S3 in FIG. 2).

(2) A fuel jet amount corresponding to a required load (electric power) of the fuel cell 103 is loaded (S4).

(3) The loaded data is compared with predetermined first set temperatures Ta (temperature of evaporation gas), Tb (temperature between Ta and Tc) and Tc (temperature for determining liquid accumulation), and second set temperatures Tb1 (safety temperature of the burner 104) and Tb2 (lower limit temperature). The following control operations are carried out.

Control of Burner Auxiliary Combustion

In FIG. 2, Fbn (a flag)=0 means that auxiliary combustion of the burner 104 is stopped (such as S1) and Fbn=1 means that auxiliary combustion of the burner 104 is carried out (S6).

(4) When the loaded combustion gas temperature Tbn of the burner 104 is, for example, smaller than or equal to 500° C. of Tb2 ("No" in S5) as shown in FIG. 3, auxiliary combustion is carried out (S6). When combustion gas temperature Tbn of the burner 104 is over 600° C. of Tb1 ("Yes" in S7), auxiliary combustion is stopped(S8).

When combustion gas temperature Tbn of the burner 104 is over 500° C. of Tb2 ("Yes" in S5) and smaller than or equal to 600° C. of Tb1 ("No" in S7), the state of the burner 104 is maintained as following ① or ②.

① When auxiliary combustion of the burner 104 is stopped ("Yes" in S9), the state in which auxiliary combustion is stopped is maintained (S10). Therefore, auxiliary combustion of the burner 104 is carried out when combustion gas temperature Tbn of the burner 104 is smaller than or equal to 500° C. of Tb2.

② When auxiliary combustion of the burner 104 is carried out ("No" in S9), the state in which auxiliary combustion is carried out is maintained (S11). Therefore, auxiliary combustion of the burner 104 is carried out until combustion gas temperature Tbn of the burner 104 is over 600° C. of Tb1.

Auxiliary combustion of the burner 104 is controlled as described above, accordingly, combustion gas temperature Tbn of the burner 104 is maintained in the vicinity of 600° C. of a predetermined region always. Therefore, combustion gas to be a heating source of the evaporator 1 is secured with stability.

Control of the supply amount of the liquid fuel to the evaporator (5) Next, a fuel jet amount of the supply amount of the liquid fuel to the evaporator 1 is reduced and controlled as follows.

A) When the loaded temperature Tsb of the bottom of the evaporation chamber is, for example, over 150° C. of Ta ("Yes" in S12) as shown in FIG. 4, a fuel jet amount is a jet amount at 100% load in accordance with a required load (electric power) of the fuel cell 103 (S19).

Following is correction of a fuel jet amount (S13).

B) When the loaded temperature Tsb of the bottom of the evaporation chamber is, for example, smaller than or equal to 150° C. of Ta ("No" in S12) and greater than or equal to 120° C. of Tb ("Yes" in S14), an upper limit of a fuel jet amount is 90% of the a fuel jet amount at 100% load (S15).

C) When the loaded temperature Tsb of the bottom of the evaporation chamber is, for example, smaller than 120° C. of Tb ("No" in S14) and greater than or equal to 80% of Tc ("Yes" S16), an upper limit of a fuel jet amount is 50% of the a fuel jet amount at 100% load (S17).

D) When the loaded temperature Tsb of the bottom of the evaporation chamber is, for example, smaller than 80% of Tc ("No" in S16), there is liquid accumulation, therefore, jetting of the liquid fuel to the evaporator 1 is stopped (S18).

As described above and shown in FIG. 2, temperature Tsb of the bottom of the evaporation chamber and combustion gas temperature Tbn of the burner 104 are loaded as data and compared with the first set temperatures Ta, Tb and Tc, and the second set temperatures Tb1 and Tb2. A fuel jet amount of the supply amount of the liquid fuel to the evaporator 1 is reduced and controlled from a fuel jet amount in accordance with a required load (electric power) of the fuel cell 103. Therefore, even if a load changes greatly in the evaporation chamber of the evaporator 1, there is no liquid accumulation. As a consequence, gas composition of outlet of the shell 3 of an evaporation chamber of the evaporator 1, is constant without variation and the whole fuel reforming apparatus of a fuel cell system can be operated with stability.

Moreover, output of the fuel cell 103 is limited by an output value in accordance with a fuel jet amount, therefore, the whole fuel cell system can be subjected to power control without laboring.

The evaporation gas from the evaporator 1 is subjected to a reforming reaction and metamorphosing reaction at a reforming device 101 of the latter part and fuel gas is generated. The fuel gas discharged from the reforming device 101 contains more than 100 ppm of carbon, therefore, for reducing carbon monoxide further, the fuel gas is introduced into a CO removing device 102. The fuel gas from which carbon monoxide is removed by the CO removing device 102 is introduced into an anode of the fuel cell 103. Hydrogen in the fuel gas is compressed by air compressor of oxidizing agent supplying means and reacts with oxygen in the air introduced into a cathode of the fuel cell 103 and electricity is generated.

As described above, when the fuel cell 103 is put under heavy power load at accelerating or going up a hill, for preventing liquid accumulation in the evaporator 1, temperature Tsb of the bottom of the evaporation chamber and combustion gas temperature Tbn of the burner 104 are loaded as data. Therefore, the fuel jet amount of the supply amount of the liquid fuel to the evaporator 1 can be reduced and controlled and a fuel reforming apparatus of a fuel cell system with good responsivity is provided.

Of course when the vehicle decelerates or goes down a hill and a load of the evaporator 1 is lightened, the fuel jet amount of the supply amount of the liquid fuel to the evaporator 1 can be controlled for preventing liquid accumulation in the evaporator 1.

It will be now appreciated that there has been presented a fuel cell system apparatus. The system apparatus includes: a fuel reforming apparatus formed of an evaporator 1 for evaporating liquid fuel, a reforming device 101 for making gas of the liquid fuel evaporated by the evaporator 1 react by a solid catalyst to form hydrogen-rich fuel gas, and a CO removing device 102 for removing carbon monoxide from the fuel gas generated by the reforming device 101; a fuel cell 103 for making hydrogen in the fuel gas provided from the fuel reforming apparatus react with oxygen provided from an oxidizing agent providing means to generate electric power; and a burner 104 for burning off-gas of an anode of the fuel cell 103 to generate combustion gas as a heating source of the evaporator 1, wherein a temperature detector 8 is provided in the evaporator 1 for detecting temperature at a bottom of an evaporation chamber, and a supply amount of the liquid fuel to the evaporator 1 is reduced and controlled from a supply amount (command value) corresponding to a required load amount of the fuel cell 103 in accordance with temperature detected by the temperature detector 8.

In such a system apparatus, the temperature detector 8 is provided at the bottom of the evaporation chamber of the evaporator 1 and the supply amount of the liquid fuel to the evaporator 1 is reduced and controlled from the supply amount (a command value) of the liquid fuel corresponding to the required load amount of the fuel cell 103 in accordance with temperature detected by the temperature detector 8. Therefore, liquid accumulation in the evaporation chamber of the evaporator 1 can be prevented.

The system apparatus may be controlled in such a way that the supply amount of the liquid fuel to the evaporator 1 is reduced and controlled on the basis of the detected temperature at the bottom of the evaporation chamber, and the liquid fuel is controlled and prevented from accumulation in liquid state in the evaporation chamber of the evaporator 1.

In such a system apparatus, the supply amount of the liquid fuel to the evaporator 1 is reduced and controlled on the basis of the detected temperature in the evaporation chamber of the evaporator 1, therefore, the liquid fuel can be controlled and prevented from accumulation in liquid state in the evaporation chamber of the evaporator 1.

Also, the system apparatus may be controlled in such a way that supply of the liquid fuel to the evaporator 1 is stopped on the basis of the detected temperature at the bottom of the evaporation chamber so as to prevent accumulation of liquid fuel in liquid state within the evaporation chamber of the evaporator 1.

In such a system apparatus, supply of the liquid fuel to the evaporator 1 is stopped on the basis of the detected temperature at the bottom of the evaporation chamber of the evaporator 1, thereby preventing accumulation of the liquid fuel in liquid state within the evaporation chamber of the evaporator 1.

Also, the system apparatus may be controlled in such a way that temperature of the combustion gas of the burner 104 is detected, auxiliary combustion is carried out or stopped in accordance with the detected temperature of the combustion gas, and the supply amount of the liquid fuel to the evaporator 1 is controlled while maintaining the temperature of the combustion gas supplied to the evaporator in a predetermined temperature range.

In such a system apparatus, the temperature of the combustion gas of the burner 104 is detected, auxiliary combustion is carried out or stopped in accordance with the detected temperature of the combustion gas and the supply amount of the liquid fuel to the evaporator 1 is controlled while maintaining the temperature of the combustion gas supplied to the evaporator 1 in a predetermined temperature range. The combustion gas as a heating source of the evaporator 1 is therefore secured in stable conditions. Liquid accumulation in the evaporation chamber of the evaporator 1 can be prevented and controlled more suitably in comparison with a case in which the supply amount of the liquid fuel to the evaporator 1 is controlled on the basis of only the detected temperature at the bottom of the evaporation chamber.

Further, the system apparatus may be controlled in such a way that when the supply amount of the liquid fuel to the evaporator 1 is subjected to "reduction" or "stop" control, output of the fuel cell 103 is limited to an output value in accordance with the supply amount of the liquid fuel.

In such a system apparatus, output of the fuel cell 103 is limited to the output value in accordance with the supply amount of the liquid fuel to the evaporator, therefore, the whole fuel cell system can be subjected to power control without laboring.

The present invention is not limited to the above-described embodiment and can be changed and carried out as appropriate in the scope in which the object of the present invention is attained and the effect of the present invention is produced. For example, as for the liquid fuel, mixed liquid fuel such as water and methanol may be used in addition to kerosene, ethyl alcohol and methanol. Moreover, a plurality of thermometers are provided the bottom of the evaporation chamber of the evaporator 1 and the fuel jet amount can be reduced and controlled on the basis of the lowest temperature.

According to the present invention providing the above-described constitution and operations, the following effects are produced.

(1) For preventing liquid accumulation in an evaporation chamber of an evaporator, control of burner auxiliary combustion and control of a supply amount of liquid fuel to the evaporator are used in combination and burner auxiliary combustion and a supply amount of liquid fuel to the evaporator can be controlled optimally. Therefore, a fuel reforming apparatus of a fuel cell system with good responsivity is provided.

(2) A temperature detector is provided on the bottom of the evaporation chamber of the evaporator and a supply amount of the liquid fuel to the evaporator is reduced and controlled from a supply amount (a command value) corresponding to a required load amount of the fuel cell in accordance with temperature detected by the temperature detector. Therefore, liquid accumulation in the evaporation chamber of the evaporator can be prevented.

(3) The supply amount of the liquid fuel to the evaporator is reduced and controlled on the basis of the detected temperature in the evaporation chamber of the evaporator, therefore, the liquid fuel can be prevented from accumulating in liquid state in the evaporation chamber of the evaporator.

(4) It is stopped to supply the liquid fuel to the evaporator on the basis of the detected temperature at a bottom of the evaporation chamber of the evaporator, therefore, the state in which the liquid fuel is accumulated in liquid state in the evaporation chamber of the evaporator can be done away with.

(5) The temperature of the combustion gas of the burner is detected, auxiliary combustion is carried out or stopped in accordance with the detected temperature of the combustion gas and the supply amount of the liquid fuel to the evaporator is controlled with maintaining the temperature of the combustion gas supplied to the evaporator in the predetermined range. Therefore, the combustion gas to be a heating source of the evaporator is secured with stability. Liquid accumulation in the evaporation chamber of the evaporator can be prevented more suitably in comparison with a case in which the supply amount of the liquid fuel to the evaporator is controlled on the basis of only the detected temperature at the bottom of the evaporation chamber.

(6) The output of the fuel cell is limited to the output value in accordance with the supply amount of the liquid fuel to the evaporator, therefore, the whole fuel cell system can be subjected to power control without laboring.

What is claimed is:

1. A method for controlling evaporation of liquid fuel in a fuel cell system including an evaporator having an evaporation chamber, a reforming device, a fuel cell and a burner, the method comprising the steps of:
   (a) supplying liquid fuel to said evaporator;
   (b) evaporating the liquid fuel in said evaporator;
   (c) reacting the evaporated liquid fuel using a solid catalyst to form a hydrogen rich fuel gas;
   (d) removing CO from the hydrogen rich fuel gas;
   (e) reacting hydrogen in hydrogen rich fuel gas with oxygen from an oxidizing agent in said fuel cell;
   (f) burning gas from the anode of said fuel cell and generating a combustion gas in said burner;
   (g) heating said evaporator using the combustion gas from said burner; and
   (h) detecting the temperature at the bottom of said evaporation chamber and controlling to reduce the supply amount of liquid fuel supplied to said evaporator, which corresponds to the load on said fuel cell, in accordance with the detected temperature.

2. A method for controlling evaporation for liquid fuel in a fuel cell system as claimed in claim 1, in which the supply amount of the liquid fuel to said evaporator is reduced and controlled on the basis of the detected temperature at the bottom of the evaporation chamber and the liquid fuel is controlled and prevented from accumulating in liquid state in said evaporation chamber of said evaporator.

3. A method for controlling evaporation for liquid fuel in a fuel cell system as claimed in claim 1, further comprises supplying the liquid fuel to said evaporator when the fuel system is stopped on the basis of the detected temperature at the bottom of said evaporation chamber and a state in which the liquid fuel is accumulated in liquid state in said evaporation chamber.

4. A method for controlling evaporation for liquid fuel in a fuel cell system as claimed in claim 1, in which temperature of the combustion gas of said burner is detected, wherein an auxiliary combustion is carried out or stopped in accordance with the detected temperature of the combustion gas and the supply amount of the liquid fuel to said evaporator is controlled with maintaining the temperature of the combustion gas supplied to said evaporator in a predetermined range.

5. A method for controlling evaporation for liquid fuel in a fuel cell system as claimed in claim 1, in which when the supply amount of the liquid fuel to said evaporator is subjected to reduction or stop control, output of said fuel cell is limited to an output value in accordance with the supply amount of the liquid fuel.

6. A method for controlling evaporation for liquid fuel in a fuel cell system as claimed in claim 2, comprises supplying the liquid fuel to said evaporator when the fuel system is stopped on the basis of the detected temperature at the bottom of said evaporation chamber and a state in which the liquid fuel is accumulated in a liquid state in said evaporation chamber.

7. A method for controlling evaporation for liquid fuel in a fuel cell system as claimed in claim 2, in which temperature of the combustion gas of said burner is detected, wherein an auxiliary combustion is carried out or stopped in accordance with the detected temperature of the combustion gas and the supply amount of the liquid fuel to said evaporator is controlled with maintaining the temperature of the combustion gas supplied to said evaporator in a predetermined range.

8. A method for controlling evaporation for liquid fuel in a fuel cell system as claimed in claim 2, in which when the supply amount of the liquid fuel to said evaporator is subjected to reduction or stop control, output of said fuel cell is limited to an output value in accordance with the supply amount of the liquid fuel.

9. A method for controlling evaporation for liquid fuel in a fuel cell system as claimed in claim 7, in which when the supply amount of the liquid fuel to said evaporator is subjected to reduction or stop control, output of said fuel cell is limited to an output value in accordance with the supply amount of the liquid fuel.

10. A method for controlling evaporation for liquid fuel in a fuel cell system as claimed in claim 6, in which temperature of the combustion gas of said burner is detected, wherein an auxiliary combustion is carried out or stopped in accordance with the detected temperature of the combustion gas and the supply amount of the liquid fuel to said evaporator is controlled with maintaining the temperature of the combustion gas supplied to said evaporator in a predetermined range.

11. A method for controlling evaporation for liquid fuel in a fuel cell system as claimed in claim 6, in which when the supply amount of the liquid fuel to said evaporator is subjected to reduction or stop control, output of said fuel cell is limited to an output value in accordance with the supply amount of the liquid fuel.

12. A method for controlling evaporation for liquid fuel in a fuel cell system as claimed in claim 10, in which when the supply amount of the liquid fuel to said evaporator is subjected to reduction or stop control, output of said fuel cell is limited to an output value in accordance with the supply amount of the liquid fuel.

13. A method for controlling evaporation for liquid fuel in a fuel cell system as claimed in claim 3, in which temperature of the combustion gas of said burner is detected, wherein an auxiliary combustion is carried out or stopped in accordance with the detected temperature of the combustion gas and the supply amount of the liquid fuel to said evaporator is controlled with maintaining the temperature of the combustion gas supplied to said evaporator in a predetermined range.

14. A method for controlling evaporation for liquid fuel in a fuel cell system as claimed in claim 3, in which when the supply amount of the liquid fuel to said evaporator is subjected to reduction or stop control, and output of said fuel cell is limited to an output value in accordance with the supply amount of the liquid fuel.

15. A method for controlling evaporation for liquid fuel in a fuel cell system as claimed in claim 13, in which when the supply amount of the liquid fuel to said evaporator is subjected to reduction or stop control, and output of said fuel cell is limited to an output value in accordance with the supply amount of the liquid fuel.

16. A method for controlling evaporation for liquid fuel in a fuel cell system as claimed in claim 4, in which when the supply amount of the liquid fuel to said evaporator is subjected to reduction or stop control, and output of said fuel cell is limited to an output value in accordance with the supply amount of the liquid fuel.

17. A fuel cell system comprising:
an evaporator having an evaporation chamber, wherein a liquid fuel is supplied to the evaporator and evaporated;
a reforming device, the reforming device configured to react the evaporated liquid fuel with a solid catalyst to form a hydrogen rich fuel gas;
a carbon monoxide removing device, the carbon monoxide removing device configured to remove carbon monoxide from the hydrogen rich fuel gas;
a fuel cell, the fuel cell configured to react hydrogen from the hydrogen rich fuel gas with oxygen provided from an oxidizing agent;
a burner, the burner configured to burn gas from an anode of the fuel cell, wherein a combustion gas is generated in the burner; and
a temperature detector positioned at the bottom of the evaporation chamber, so that a supply amount of the liquid fuel, which corresponds to a load on the fuel cell, is controlled to be less based on a detected temperature.

18. A fuel cell system as claimed in claim 17, which the supply amount of the liquid fuel to said evaporator is reduced and controlled on the basis of the detected temperature at the bottom of the evaporation chamber, and the liquid fuel is controlled and prevented from accumulation in liquid state in said evaporation chamber of said evaporator.

19. A fuel cell system as claimed in claim 17, in which supply of the liquid fuel to said evaporator is stopped on the basis of the detected temperature at the bottom of said evaporation chamber so as to prevent accumulation of liquid fuel in liquid state within the evaporation chamber of said evaporator.

20. A fuel cell system as claimed in claim 18, in which supply of the liquid fuel to said evaporator is stopped on the basis of the detected temperature at the bottom of said evaporation chamber so as to prevent accumulation of liquid fuel in liquid state within the evaporation chamber of said evaporator.

21. A fuel cell system claimed in claim 17, in which temperature of the combustion gas of said burner is detected, auxiliary combustion is carried out or stopped in accordance with the detected temperature of the combustion gas, and the supply amount of the liquid fuel to said evaporation is controlled while maintaining the temperature of the combustion gas supplied to said evaporator in a predetermined temperature range.

22. A fuel cell system as claimed in claim 17, in which when the supply amount of the liquid fuel to said evaporator is subjected to reduction or stop control, and output of said fuel cell is limited to an output value in accordance with the supply amount of the liquid fuel.

23. A fuel cell system as claimed in claim 21, in which when the supply amount of the liquid fuel to said evaporator is subjected to reduction or stop control, and output of said fuel cell is limited to an output value in accordance with the supply amount of the liquid fuel.

* * * * *